United States Patent [19]

Larsen et al.

[11] Patent Number: 5,621,599

[45] Date of Patent: Apr. 15, 1997

[54] SWITCHED MOV DEVICE

[75] Inventors: Einar V. Larsen, Charlton; Murray A. Eitzmann, Ballston Lake, both of N.Y.; Loren H. Walker, Salem, Va.

[73] Assignee: General Electric Company, Schenectady, N.Y.

[21] Appl. No.: 304,907

[22] Filed: Sep. 13, 1994

[51] Int. Cl.$^6$ ............................................. H02H 9/04
[52] U.S. Cl. .......................... 361/56; 361/91; 361/111; 361/58
[58] Field of Search .......................... 361/56, 91, 111, 361/58

[56] References Cited

U.S. PATENT DOCUMENTS

| | | | |
|---|---|---|---|
| 4,475,139 | 10/1984 | Chadwick | 361/91 |
| 4,912,589 | 3/1990 | Stolarczyk | 361/56 |
| 5,157,572 | 10/1992 | Bird | 361/56 |

Primary Examiner—Todd E. DeBoer
Attorney, Agent, or Firm—Nixon & Vanderhye P.C.

[57] ABSTRACT

A metal oxide varistor in series with a semiconductor switch forms a protection circuit that reduces the steady-state voltage across the metal oxide varistor during normal operation, During an overvoltage transient condition, the semiconductor switch is gated on and the metal oxide varistor is placed in the voltage clamping mode.

2 Claims, 2 Drawing Sheets

SWITCHED MOV DEVICE

This invention was conceived under government contract DNA001-88-C-0028, and the Government has certain rights in this invention.

TECHNICAL FIELD

The technical field in which the invention resides is that of a metal oxide varistor protection circuit for power conditioning systems.

BACKGROUND

Metal oxide varistors (MOV) are state of the art protection devices that are directly connected across the terminals of a power conditioning circuit. For power conditioning circuits such as GTO and SCR converters they provide for component protection from transients and temporary overvoltages. In many applications large capacitors are also directly connected across the terminals and parallel with the MOV to provide for fast transient overvoltage protection.

The MOV device or arrestor operates in a standby mode under maximum steady state voltage conditions and in a voltage clamping mode under transient conditions. The MOV device has a maximum-continuous operating voltage (MCOV) characteristic. This greatly reduces the steady state peak voltage relative to the clamping level for the direct connected MOV device. In high power GTO and SCR converters large harmonics caused by switching are present. These cause increased heating and standby power dissipation requirements for the MOV which further reduce the steady state peak voltage relative to the clamping level.

The MCOV characteristic can be increased by cooling. Cooling, however, increases the standby power dissipation and tends to force the current into a narrow channel. The MCOV characteristic can also be increased by adding more columns of MOVs. However, a large number of parallel columns of MOVs is impractical.

A figure of merit for the MOV clamping circuit is the voltage clamping ratio (VCR). This is expressed as a ratio of voltage clamped (at a given coordinating current) to the peak maximum continuous operating voltage. For a given peak MCOV the lowest protection level is defined by the voltage clamping ratio. Where $V_m(ac)$ rms is the maximum continuous operating voltage, the recurrent peak voltage is $\sqrt{2}$ times this value. For non-sinusoidal waveforms the peak voltage of the fundamental and harmonics must be below the recurrent peak voltage rating. A voltage clamping ratio approaching 1.0 is ideal. However, direct connected MOVs provide a clamping circuit that has a minimum voltage clamping ratio of about 1.6 for typical coordinating currents.

In circuit design, the voltage withstand capability of the equipment is protected by a margin from transient and temporary overvoltage. Where added components are used to increase the voltage withstand capability, equipment cost increases. By decreasing the voltage clamping ratio of the protection circuit a cost saving may be achieved in the design of protected equipment.

DISCLOSURE OF THE INVENTION

The invention decreases the voltage clamping ratio to below 1.3 by providing a thyristor switch and a low current grading circuit in circuit with the MOV. This reduces the steady state voltage across the MOV during normal operation. The thyristor switch turns on when an overvoltage transient occurs.

BEST MODE FOR CARRYING OUT THE INVENTION

Figure 1:
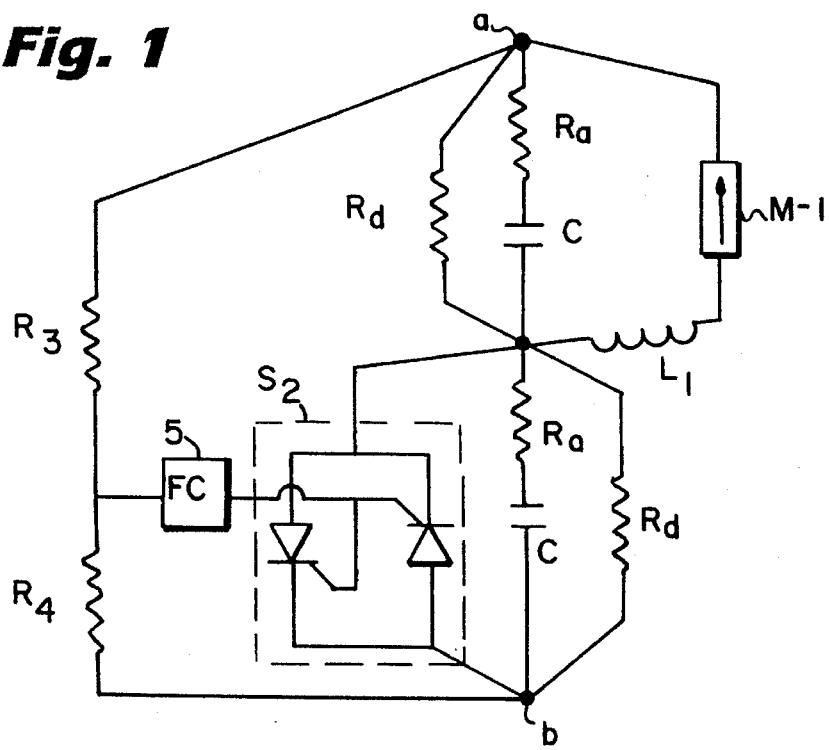
FIG. 1 shows a switched MOV device.

In FIG. 1 a MOV device M1 is shown connected in series, via an inductor L1, with a semiconductor switch S2. The switch S2 in this circuit is comprised of a pair of anti-parallel connected thyristors. The inductor L1 is a commutating inductance that also functions as a surge inductance. An AC and DC voltage grading circuit is connected across the terminals a–b. The voltage grading circuit is comprised of two resistor-capacitor networks, each with a resistor Ra, Capacitor C and resistor Rd. One resistor-capacitor network is connected across the MOV device and the other is connected across the semiconductor switch. This arrangement provides that the voltage across each resistor-capacitor network is one-half the voltage across the terminals a–b. The semiconductor switch normally operates in a blocked state. When the voltage across the terminals a–b exceeds a set threshold voltage, the semiconductor switch is switched to the on state. Resistors R3 and R4 and a firing circuit 5 form an operational circuit for gating the switch on. Any conventional firing circuit, as those skilled in the art will appreciate, can be used.

The AC grading circuit in addition to providing for voltage division acts as a snubber for the thyristors. The DC grading circuit ensures that a build up of DC voltage does not occur at the midpoint of the circuit.

An exemplary circuit comprises an MOV device 1 in the form of ten columns of three inch discs in series with an anti-parallel pair of 77 mm thyristors. With a peak MCOV of about 4500 volts across the device, half is across the MOV and half is across the thyristor switch. The thyristor switch will be in the normally blocked state and will be switched on by an overvoltage transient. A 5700 volt clamping level at a coordinating current of 20,000 Amps can be achieved by gating on the thyristors, thereby fully connecting the MOV across the device. The MOV voltage(V)-current(I) characteristic is as below:

| I (amps) | V (volts) |
|---------|-----------|
| 0.030 | 3750 |
| 10 | 4270 |
| 500 | 4550 |
| 5000 | 4930 |
| 20000 | 5360 |

The above characteristic is for a 10-column MOV of conventional design and natural cooling having a 2200 V rms MCOV rating. While the voltage clamping ratio of the MOV alone (5635/1.414*2200) is 1.81. The voltage clamping ratio across the whole device (5700/4500) is less than 1.3 including an allowance of 200–300 volts across the surge limiting inductor.

Because the voltage clamping ratio of the direct connected MOV can easily be below 2.0 (1.81 in the example), it is apparent that reducing the MCOV to one half by normally blocking the gating of the thyristors allows the voltage clamping ratio to be reduced to 1.0 or below.

Figure 2:
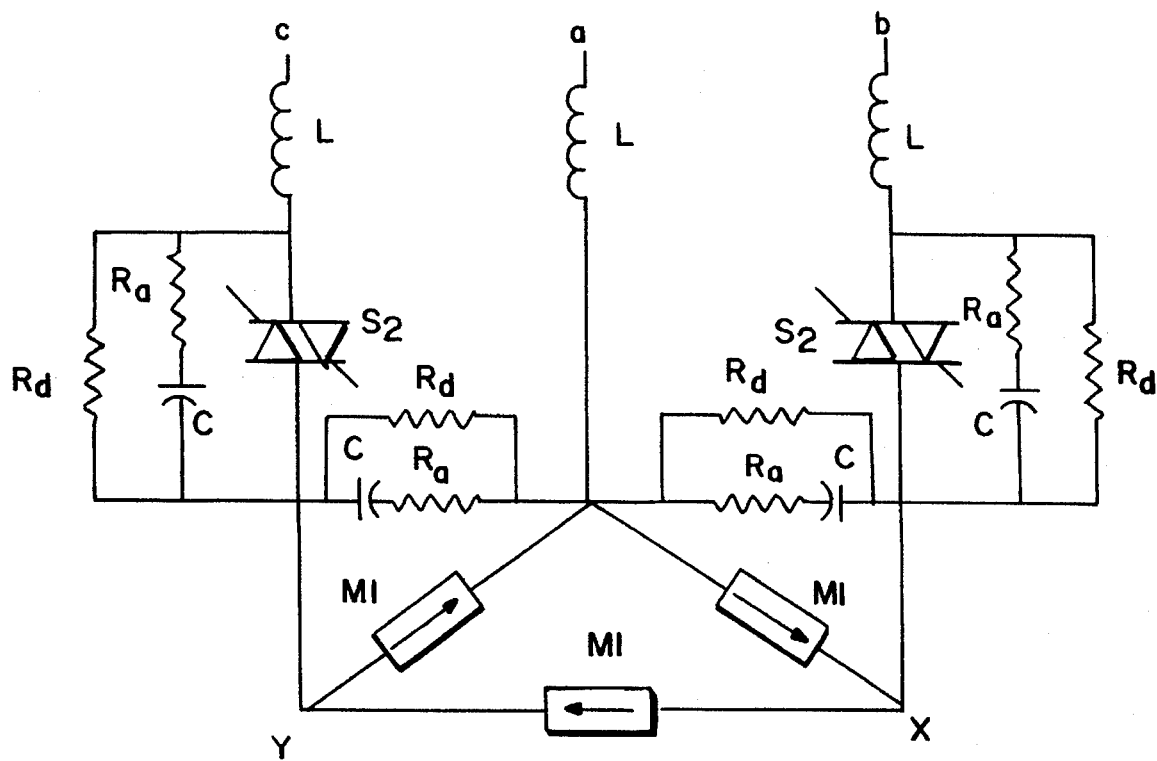
FIG. 2 shows a three phase arrangement.

FIG. 2 shows a three phase circuit using switched MOV devices. Three MOV devices M1 are connected in a delta arrangement. One semiconductor switch S2 is connected to point X and a second semiconductor switch S2 is connected to point Y. Circuits comprised of resistors Ra, Rd and capacitor C are connected in parallel with each switch S2 and two of the MOV devices M1 as shown. This arrangement uses only two semiconductor switches.

Figure 3:
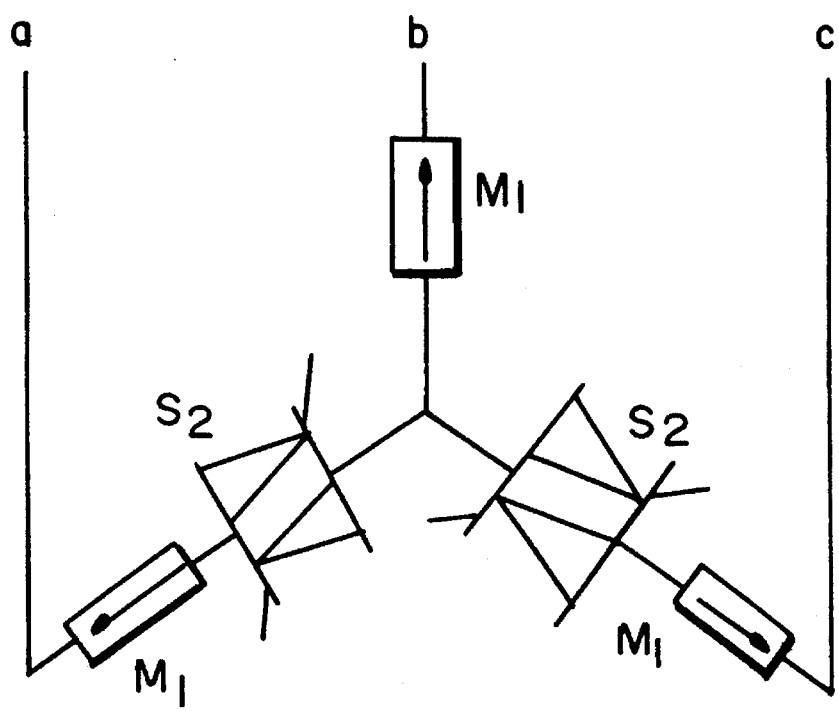
FIG. 3 shows a second three phase arrangement.

The FIG. 3 embodiment is a simplified schematic of a three phase Y arrangement. Switched MOV devices are provided in two legs of the Y, and a MOV device provides the third leg. As can be appreciated by those skilled in the art, in this embodiment the resistor-capacitor networks and thyristor firing circuit are not illustrated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An overvoltage protection circuit comprising:

a metal oxide varistor in a first circuit portion and a pair of anti-parallel connected thyristors in a second circuit portion in series circuit;

a current grading circuit comprising a first resistor-capacitor network coupled in parallel with said first circuit portion and a second series resistor-capacitor network connected in parallel with said second circuit portion; and a pair of resistors connected in series and further connected in parallel with said series circuit and a firing circuit connected to the gate of the thyristors and to the junction point of said pair of resistors.

2. An overvoltage protection circuit of claim 1 wherein said thyristors are normally blocked and reduce the steady state voltage across said metal oxide varistor during normal operation and turn on when an overvoltage transient exceeds a predetermined value.

* * * * *